United States Patent Office 3,558,269
Patented Jan. 26, 1971

3,558,269
PHOSPHORO- AND PHOSPHONOFLUORIDO-THIOIC ACIDS AND THEIR SALTS
Herbert W. Roesky, Gottingen, Germany, assignor to E. I. du Pont de Nemours and Company, Wilmington, Del., a corporation of Delaware
No Drawing. Continuation-in-part of application Ser. No. 569,810, Aug. 3, 1966. This application Mar. 5, 1968, Ser. No. 715,466
Int. Cl. C01d 11/00; C01f 1/00
U.S. Cl. 23—50       16 Claims

ABSTRACT OF THE DISCLOSURE

Claimed are phosphonofluoridothioic acids and their salts, useful as reducing agents, of the formulas:

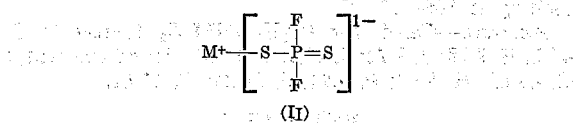
(II)

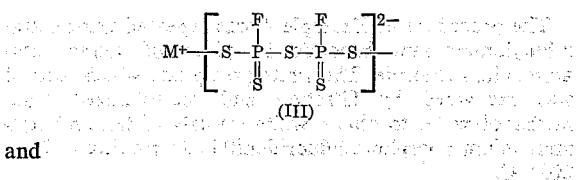
(III)

and

(IV)

in which M is hydrogen, a metal, or specified types of onium cations; preparation of those in which M is an alkali metal by reacting $P_4S_{10}$ with an alkali metal fluoride in the presence of (a), for (II), acetonitrile, (b), for (III), water, and (c), for (IV), ethylene glycol dimethyl ether; and in preparation of (II), when M is an alkali metal, by reacting $SPF_3$ with an alkali metal fluoride in the presence of acetonitrile.

RELATED APPLICATION

This application is a continuation-in-part of my co-pending application, Ser. No. 569,810, filed, and now forfeited, Aug. 3, 1966.

FIELD OF THE INVENTION

This invention relates to a novel class of inorganic acids and salts, and to methods of preparing them.

DESCRIPTION OF THE INVENTION

The compounds of this invention are phosphonofluoridothioic acids and their salts. They can be represented by the molecular formula $$M_{n'}^{m+}(P_nF_2S_x)_{m'}^{n-} \qquad (I)$$

wherein:

$n$, both the number of phosphorus atoms present in the anion and the valance of the anion, is 1 or 2; $m$, the valance of the cation, is 1, 2, 3 or 4; $n'$ is the number of cations present in the molecule; $m'$ is the number of anions present in the molecule; the product $nm'$ is equal to the product $n'm$; when $n$ is 1, $x$, the number of sulfur atoms present, is 2 and M is any cation of positive valance up to 4; and when $n$ is 2, $x$ is 5 or 6 and M is hydrogen, ammonium, an alkali or alkaline earth metal or a hydrocarbyl-onium group.

In general Formula I, shown above, when $n$ is 1, M is preferably hydrogen, ammonium, a hydrocarbyl-substituted ammonium, sulfonium, arsonium or phosphonium ion in which the hydrocarbyl groups have 18 or fewer carbon atoms, or any metal, i.e., an element of atomic number 3, 4, 11–13, 19–32, 37–51, 55–84, 87–103, and above.

In general Formula I, shown above, when $n$ is 2, M is preferably hydrogen, ammonium, a hydrocarbyl-substituted ammonium, sulfonium, arsonium, or phosphonium ion in which the hydrocarbyl groups have 18 or fewer carbon atoms, lithium, sodium, potassium, cesium, magnesium, calcium, strontium, or barium.

The invention also embraces the process of preparing the above compounds by the reaction of phosphorus pentasulfide, $P_4S_{10}$, with an alkali metal fluoride in, respectively, acetonitrile (yielding products in which $n$ is 1 and $x$ is 2), water (yielding products in which $n$ is 2 and $x$ is 5), and ethylene glycol dimethyl ether (yielding products in which $n$ is 2 and $x$ is 6). Alkali metals include Li, Na, K, Rb, Cs and Fr.

The alkali metal salts which are first formed are highly soluble. Salts with other cations are prepared by metathesis and by reaction of the corresponding free acids with known bases. The free acids are obtained by passing a solution of one of the soluble salts through a cation-exchange resin in acid form, followed by removing the solvent. Temperatures and pressures are not critical in the process steps of this invention, and ambient temperatudes and pressures may be empolyed as well as those above and below normal.

Mole ratios are also not critical in the process of the invention. Phosphorus thiofluoride and cesium fluoride are believed to react to equimolar quantities forming one mole of cesium phosphorodifluoridodithioate for each mole of cesium hexafluorophosphate produced:

$$2SPF_3 + 2CsF \rightarrow CsPF_2S_2 + CsPF_6$$

Though it is preferred to use equimolar quantities of $SPF_3$ and CsF, the reactants may be used in any desired ratio. The ratio of $P_4S_{10}$ to NaF used in preparing $[PF_2S_2]^{1-}$, $[P_2F_2S_5]^{2-}$, and $[P_2F_2S_6]^{2-}$ is not limited to the quantities specified in the examples, below, and the molar ratio of $P_4S_{10}$:NaF may be varied widely, for example, from about 1:1 to 1:20 with ratios of 1:6 to 1:14 preferred.

The products of this invention are all useful as chemical reducing agents. Thus, in neutral or alkaline systems they reduce permanganate to $MNO_2$, and in acid systems they reduce permanganate to manganous ion.

The compounds of this invention are much more stable to aqueous hydrolysis than corresponding compounds in which the anions contain oxygen in place of sulfur. In soluble form the anions of this invention are useful for removing large cations from solutions by precipitation, particularly tetrasubstituted ammonium cations as shown below.

The several anions embraced in Formula I may be visualized, respectively, as indicated in Formulas II, III, and IV:

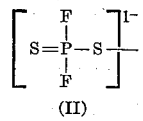
(II)

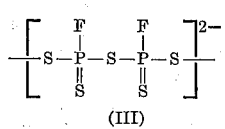
(III)

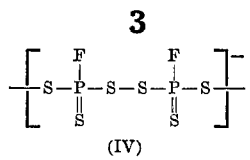

(IV)

in which the phosphorodifluoridodithioate anion of Formula II represents the monovalent anion obtained when the first step of the process is carried out in acentonitrile. The P,P'-thiobis(phosphonofluoridodithioate) dianion of Formula III and the P,P'-dithiobis(phosphonofluoridodithioate) dianion of Formula IV represent the divalent anions obtained when the first step of the process is carried out, respectively, in water and the dimethyl ether of ethylene glycol (glyme).

Alkali metal salts of the formula $M'PF_2S_2$, where $M'$ is an alkali metal as above and the anion is as shown in Formula II, can also be prepared by the reaction of an alkali metal fluoride with phosphorus thiofluoride, $SPF_3$, in the presence of acetontitrile according to the equation

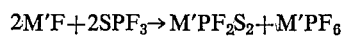

As illustrated in Example 1, this process is readily carried out at ambient temperatures and pressures. An improved process for preparing the starting material, $SPF_3$, is fully described and claimed in my U.S. Pat. 3,387,950.

EMBODIMENTS OF THE INVENTION

In the examples which follow, parts are by weight unless otherwise indicated.

EXAMPLE 1

To a slurry of 2 g. of CsF in 15 ml. of acetonitrile, $SPF_3$ was added slowly at room temperature until it was no longer absorbed. During the reaction, $CsPF_6$ was precipitated. The mixture was allowed to stand overnight and the $CsPF_6$ was removed by filtration. The filtrate was evaporated under reduced pressure to obtain cesium phosphorodifluoridodithioate, $CsPF_2S_2$, as a crystalline solid. Its identity was confirmed by infrared absorption, nuclear magnetic resonance, and elemental analysis.

A slight chemical excess of cesium phosphorodifluoridodithioate in water solution was added to an aqueous solution of potassium permanganate. The purple color of the solution immediately disappeared, and the permanganate was reduced to $MnO_2$.

EXAMPLE 2

Part A

A mixture of 4.4 g. of $P_4S_{10}$, 2.5 g. of NaF, and 150 ml. of acetonitrile was stirred under a nitrogen atmosphere and heated at 40–80° C. for about ½ hour. When the reaction mixture returned to room temperature, it was filtered and the acetonitrile was evaporated from the filtrate at reduced pressure to yield a pale yellow solid which was dissolved in 20 ml. of concentrated aqueous NaF to obtain a solution of sodium phosphorodifluoridodthioate, $NaPF_2S_2$.

Part B

The solution obtained in Part A above was filtered and the filtrate treated with an aqueous solution of tetra-n-propylammonium bromide to obtain crystalline tetra-n-propylammonium phosphorodifluoridodithioate in the form of white precipitate which was recovered by filtration, recrystallized, and dried at reduced pressure. The yield was 2.6 g.

EXAMPLE 3

Twenty grams of $CsPF_2S_2$ was dissolved in 100 ml. of water and the solution passed through a column of cation-exchange resin in acid form and washed through with additional water. The eluate of aqueous phosphorodifluoridodithioic acid was subjected to fractional distillation in a spinning band column at reduced pressure. Water was removed at 5 mm. and 20 ml. of hydrated $HPF_2S_2$ was obtained as a colorless liquid boiling at 19–25° C. at 1.5 mm. pressure.

EXAMPLE 4

An aqueous solution of $CsPF_2S_2$ at room temperature was stirred and treated dropwise with an equivalent amount of 0.5 N aqueous solution of tetramethylammonium chloride. The resulting mixture was cooled to 0° C. and the white precipitate of tetramethylammonium phosphorodifluoridodithioate, $(CH_3)_4NPF_2S_2$, was separated by filtration and purified by recrystallization from water.

EXAMPLE 5

The procedure of Example 4 was repeated using tetrapropylammonium bromide in place of tetramethylammonium chloride. The white precipitate which formed was collected by filtration and recrystallized from hot methanol to obtain tetra-n-propylammonium phosphorodifluoridodithioate in the form of needle-shaped crystals melting at 166–167° C.

Analysis.—Calcd. for $(C_3H_7)_4NPF_2S_2$ (percent): C, 45.2; H, 8.78; P, 9.72; S, 20.1; F, 11.91. Found (percent): C, 45.63; H, 9.07; P, 9.94; S, 20.25; F, 11.61.

EXAMPLE 6

The procedure of Example 4 was repeated using tetra-n-butylammonium bromide in place of tetramethylammonium chloride. The white precipitate which formed was recovered by filtration and recrystallized from methanol/water to obtain white crystals of tetra-n-butylammonium phosphorodifluoridodithioate melting at 208–209° C.

Analysis.—Calcd. for $(C_4H_9)_4NPF_2S_2$ (percent): C, 51.2; H, 9.6; P, 8.25; S, 17.06. Found (percent): C, 51.09; H, 9.62; P, 8.31; S, 17.06.

EXAMPLE 7

The procedure of Example 4 was repeated using tetraphenylarsonium chloride in place of tetramethylammonium chloride. The white precipitate which formed was recovered by filtration and recrystallized from methanol to obtain crystalline tetraphenylarsonium phosphorodifluoridodithioate melting over the range of 283–289° C.

Analysis.—Calcd. for $(C_6H_5)_4AsPF_2S_2$ (percent): C, 55.8; H, 3.88; P, 6.02; F, 7.36; S, 12.4. Found (percent): C, 55.72; H, 4.06; P, 6.66; F, 7.37; S, 13.86.

EXAMPLE 8

The procedure of Example 4 was repeated using methyltriphenylphosphonium bromide in place of tetramethylammonium chloride. The white solid which was obtained was recovered by filtration and recrystallized from methanol to obtain crystalline methyltriphenylphosphonium phosphorodifluoridodithioate melting at 139–140° C.

Analysis.—Calcd. for $CH_3(C_6H_5)_3P_2F_2S_2$ (percent): C, 55.6; H, 4.38; P, 15.13; F, 9.26; S, 15.6. Found (percent): C, 55.8; H, 4.40; P, 15.19; F, 9.57; S, 15.91.

EXAMPLE 9

A solution of cesium phosphorodifluoridodithioate in water/methanol was mixed at room temperature with an equivalent amount of tetrabenzylphosphonium bromide dissolved in water/methanol. The white solid which precipitated was collected by filtration and recrystallized from water/methanol to obtain crystalline tetrabenzylphosphonium phosphorodifluoridodithioate, $(C_6H_5CH_2)_4P(PF_2S_2)$.

EXAMPLE 10

To an aqueous solution of cesium phosphorodifluoridodithioate was slowly added with stirring an 8% aqueous solution of thallium nitrate. The white precipitate which formed was recovered by filtration and dried to obtain crystalline thallium phosphorodifluoridodithioate.

*Analysis.*—Calcd. for TlPF$_2$S$_2$ (percent): P, 9.2; S, 19.0; F, 11.28. Found (percent): P, 8.8; S, 19.07; F, 10.35.

EXAMPLE 11

Part A

To a slurry of 10 g. of NaF in 100 ml. of water was added 8 g. of P$_4$S$_{10}$. The mixture was stirred and heated at 30–40° C. for 15 minutes. The mixture was filtered to yield a clear aqueous solution of sodium P,P'-thiobis (phosphonofluoridodithioate), Na$_2$P$_2$F$_2$S$_5$.

Part B

To the solution obtained in Part A was added 20 ml. of water followed by an aqueous solution of tetra-n-propylammonium bromide. The white precipitate which formed was recovered by filtration and recrystallized from water/methanol to obtain crystalline tetra-n-propylammonium P,P' - thiobis(phosphonofluoridodithioate) which melted with decomposition at 201–202° C. It was soluble in methanol, chloroform, and hot water. When the resulting solutions were allowed to stand, H$_2$S slowly evolved.

*Analysis.*—Calcd. for [(C$_3$H$_7$)$_4$N]$_2$P$_2$F$_2$S$_5$ (percent): C, 45.6; H, 8.5; P, 9.78; S, 25.3; F, 6.2. Found (percent): C, 45.67; H, 8.83; P, 9.97; S, 25.0; F, 6.18.

EXAMPLE 12

Part A

A mixture of 4.4 g. of P$_4$S$_{10}$, 2.5 g. of NaF, and 50 ml. of the dimethyl ether of ethylene glycol was stirred under nitrogen and heated at 40–75° C. for one-half hour. The reaction mixture was cooled to room temperature, and the solvent was evaporated at reduced pressure to leave the corresponding etherate of sodium P,P'-dithiobis(phosphonofluoridodithioate) in the form of a tan viscous liquid.

Part B

The viscous liquid obtained in Part A was dissolved in water. The solution was filtered and treated with an equivalent amount of an aqueous solution of tetra-n-propylammonium bromide. The white precipitate which formed was recovered by filtration, washed with methanol, and recrystallized from hot methanol to yield crystalline tetra-n-propylammonium P,P' - dithiobis(phosphonofluoridodithioate) melting at 213–214° C. (decomp.).

*Analysis.*—Calcd. for [(C$_3$H$_7$)$_4$N]$_2$P$_2$F$_2$S$_6$ (percent): C, 43.35; H, 8.48; N, 4.22; S, 28.95; P, 9.31; F, 5.72. Found (percent): C, 43.31; H, 8.61; N, 4.34; S, 29.66; P, 9.67; F, 5.44.

When the sodium P,P'-thiobis(phosphonofluoridodithioate) of Example 11 is substituted for cesium phosphorodifluoridodithioate in the procedure of Example 3, the free acid P,P'-thiobis(phosphonofluoridodithioic) acid, H$_2$P$_2$F$_2$S$_5$, is obtained.

When the sodium P,P'-dithiobis(phosphonofluoridodithioate) of Example 12 is substituted for cesium phosphorodifluoridodithioate in the procedure of Example 3, the free acid, P,P'-dithiobis(phosphonofluoridodithioic) acid, H$_2$P$_2$F$_2$S$_6$, is obtained.

EXAMPLE 13

Polyphosphoric acid (275 g., 83.0% P$_2$O$_5$ content), n-decane (100 ml.), and cesium phosphorodifluoridodithioate (40 g.) were mechanically stirred for 1 hour at 100° C. under a blanket of nitrogen in a flask fitted with a reflux condenser. The mixture was allowed to cool to room temperature, and the resulting n-decane solution of HPF$_2$S$_2$ was decanted from the insoluble residue and fractionally distilled at atmospheric pressure in the absence of air to yield 10.8 g. of anhydrous HPF$_2$S$_2$ boiling at 71–72° C. An additional 1.7 g. of anhydrous HPF$_2$S$_2$ was obtained by combining the spent n-decane with the original residue, stirring, heating briefly at 145° C., decanting and fractionally distilling the n-decane layer.

The HPF$_2$S$_2$ was redistilled (B.P. 72° C.) and characterized as follows:

*Analysis.*—Calcd. for HPF$_2$S$_2$ (percent): H, 0.8; S, 47.8; P, 23.1; F, 28.3. Found (percent): H, 0.9; S, 49.0; P, 22.7; F, 28.5.

Molecular weight.—Calcd., 134. Found (by mass spectrography), 134.

Infrared spectrum (gas phase).—Absorbed at 2610 cm.$^{-1}$ (S–H stretch) with other major peaks at 935, 885, 838, and 720 cm.$^{-1}$.

NMR spectrum.—Undiluted, there was a single line at 6.05τ (tetramethylsilane reference). The F$^{19}$ spectrum was a doublet: J=1214 c.p.s., δ=+15.8 p.p.m. (CFCl$_3$, internal reference).

pK$_a$ of the acid in water was 1.0+0.2.

Solubility, etc.—The acid was a colorless, hygroscopic liquid which dissolved in tetramethylsilane, fluorotrichloromethane, and a variety of common organic solvents such as petroleum ether (B.P. 37.5–52.8° C.), benzene and dichloromethane.

EXAMPLE 14

This example illustrates the use of anhydrous HPF$_2$S$_2$, obtained as in Example 13, in preparing transition metal salts.

Part A

Nickel(II) bis(phosphorodifluoridodithioate) was prepared in a sublimation apparatus vented to permit escape of hydrogen formed during the reaction. The apparatus was flushed with nitrogen and 2.3 g. of nickel powder and 5.0 g. of anhydrous HPF$_2$S$_2$ was placed in the lower portion of the apparatus. The cold finger portion of the sublimer was cooled with ice and the reactants were stirred by use of a magnetic stirring bar at 110° C. for 45 minutes. The apparatus was then evacuated to a pressure of 14$^{-4}$ mm. of mercury and the product was sublimed at 100° C. onto the cold finger. The product was resublimed in a vacuum of 10$^{-4}$ mm. at room temperature. The twice sublimed product weighed 2.7 g., M.P. 43–44° C.

*Analysis.*—Calcd. for Ni(PF$_2$S$_2$)$_2$ (percent): Ni, 18.1; S, 39.5; P, 19.1; F, 23.4. Found (percent): Ni, 17.9; S, 39.4; P, 20.0; F, 23.1.

The solid product was black by reflected light, green by transmitted light, and purple in the gaseous state at 260° C. The infrared spectrum of the material in a high boiling hydrocarbon oil mull had major peaks at 900 and 700 cm.$^{-1}$ in the 4000–670 cm.$^{-1}$ region. The F$^{19}$ n.m.r. spectrum of Ni(PF$_2$S$_2$)$_2$ in hexane solution consisted of a doublet [J=1326 c.p.s., δ=+18.9 p.p.m. (internal CFCl$_3$ reference)] with line widths comparable to those of HPF$_2$S$_2$. The complex in dichloromethane solution is diamagnetic, and it follows that the structure is probably square planar:

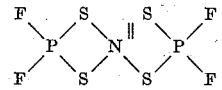

Nickel bis(phosphorodifluoridodithioate) dissolved in common organic solvents such as hexane, benzene, and dichloromethane. In the vapor state it was stable for a protracted period of time at 260° C. under reduced pressure. It reacted readily with water or oxygen. The above method used in preparing Ni(PF$_2$S$_2$)$_2$, was also used in preparing Cr(PF$_2$S$_2$)$_3$, Mn(PF$_2$S$_2$)$_2$, FE(PF$_2$S$_2$)$_2$, Co(PF$_2$S$_2$)$_2$, Zn(PF$_2$S$_2$)$_2$, Cd(PF$_2$S$_2$)$_2$, and Hg(PF$_2$S$_2$)$_2$, all of which were volatile. Copper(I) phosphorodifluoridodithioate, prepared by reaction of copper and anhydrous HPF$_2$S$_2$ at 100° C. was not volatile.

Part B

Silver(I) phosphorodifluoridodithioate was prepared by adding somewhat more than two moles of anhydrous HPF$_2$S$_2$ to one mole of silver(I) oxide suspended in toluene under a nitrogen blanket. An exothermic reaction took place and white insoluble AgPF₂S₂ formed by the reaction was isolated by filtration. The silver salt melted at 151° C.

*Analysis.*—Calcd. for AgPF₂S₂ (percent): P, 12.9. Found (percent): P, 12.9.

The salt was insoluble in dichloromethane and tetrahydrofuran but dissolved in acetone.

Part C

Cobalt(III) tris(phosphorodifluoridodithioate) was obtained when Co(PF₂S₂)₂, prepared as described in Part A of this example, was oxidized with air in the presence of anhydrous HPF₂S₂. A round-bottom flask, equipped with a magnetic stirrer, an inlet tube reaching to the bottom, a dry ice-cooled reflux condenser, and an exit port was charged with 10 g. of Co(PF₂S₂)₂, 4.1 g. of anhydrous HPF₂S₂, and 50 ml. of toluene, and 2.6 liters of air, measured at 25° C. and atmospheric pressure and dried over P₂O₅, was led into the solution at room temperature over a 50-minute period. Toluene was removed at reduced pressure, and the crude product was distilled at 60° C. and collected at 0° C. in a molecular still at about 10⁻⁴ mm. of mercury pressure. The thus obtained crude Co(PF₂S₂)₃ was twice recrystallized from hexane at −35° C. and twice sublimed. The yield of purified Co(PF₂S₂)₃, M.P. 34° C., was 1.9 g.

*Analysis.*—Calcd. for Co(PF₂S₂)₃ (percent): Co, 12.9; S, 42.0; P, 20.3; F, 24.9. Found (percent): Co, 12.9; S, 41.6; P, 20.2; F, 25.0.

Cobalt(III) tris(phosphorodifluoridodithioate) was brown in color and soluble in hexane, toluene, dichloromethane, and many other common organic solvents. Its F¹⁹ n.m.r. spectrum at 56.4 megacycles/sec. in toluene/CFCl₃ solution consisted of two complex peaks, each of approximately 134 cycles/sec. width at half-height, centered at −425 cycles/sec. and +897 cycles/sec., respectively, with reference to CFCl₃.

The corresponding Fe³⁺ compound, Fe(PF₂S₂)₃ was prepared similarly by reaction of Fe(PF₂S₂)₂ with air in the presence of anhydrous HPF₂S₂.

EXAMPLE 15

Cobalt(III) tris(phosphorodifluoridodithioate) formed when Co(PF₂S₂)₂ was simply mixed with excess

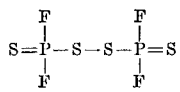

prepared as described in copending patent application Ser. No. 569,847, filed Aug. 3, 1966. Within 3 minutes of mixing the two, the color changed from green to brown, and the solution gave the characteristic n.m.r. resonance spectrum described in Example 14, Part C, for Co(PF₂S₂)₃.

EXAMPLE 16

The usually high and characteristic volatility of transition metal phosphorodifluoridodithioates may be utilized in separating the transition elements by fractional sublimation and by gas chromatographic methods.

Part A

Separation by fractional sublimation is illustrated in the case of Ni(PF₂S₂)₂ and Mn(PF₂S₂)₂. The nickel salt sublimed at 25° C. and a pressure of 10⁻⁴ mm. of mercury. Under these conditions, little or no Mn(PF₂S₂)₂ sublimed, and a temperature of 120–140° C. was required to produce a rate of sublimation comparable to that of Ni(PF₂S₂)₂ at 25° C.

Part B

When Co(PF₂S₂)₂, Ni(PF₂S₂)₂ and Cr(PF₂S₂)₃ were vaporized at 200° C. and swept by helium, flowing at 80 ml./min., into a one meter by 0.25 inch stainless steel column at 150° C. packed with 20 weight percent silicone oil-200 on 60–80 mesh silanized diatomaceous earth, the times of retention were 1.95, 2.65, and 8.8 minutes, respectively. This shows that the metals complexed with this ligand may be readily separated by gas chromatographic technique.

A convenient method for preparing salts of this invention is by neutralization of an aqueous solution of one of the free acids with a solution or suspension of an oxide or hydroxide. Thus, when solutions of phosphorodifluoridodithioic acid, HPF₂S₂, are neutralized with an oxide or hydroxide of Li⁺, Na⁺, Mg⁺⁺, Al⁺⁺⁺, K⁺, Ca⁺⁺, Ti⁺⁺⁺⁺, Cr⁺⁺⁺, Mn⁺⁺, Fe⁺⁺, Fe⁺⁺⁺, Co⁺⁺, Co⁺⁺⁺, Ni⁺⁺, Ni⁺⁺⁺, Cu⁺⁺, Zn⁺⁺, Rb⁺, Sr⁺⁺, Mo⁺⁺⁺, Ag⁺, Cd⁺⁺, Sn⁺⁺, Cs⁺, Ba⁺⁺, Hg⁺⁺, Pb⁺⁺, or Bi⁺⁺⁺, the corresponding phosphorodifluoridodithioates are obtained, and are recovered by removal of solvent.

Likewise, when solutions of P,P'-thiobis(phosphonofluoridodithioic)acid or P,P'-dithiobis(phosphonofluoridodithioic) acid are neutralized with an oxide or hydroxide of Li⁺, Na⁺, K⁺, Cs⁺, Fr⁺, Be⁺⁺, Mg⁺⁺, Ca⁺⁺, Sr⁺⁺, Ba⁺⁺, or Ra⁺², the corresponding P,P'-thiobis-(phosphonofluoridodithioate) and P,P'-dithiobis(phosphonofluoridothioate) salts, respectively, are obtained and are recovered by removal of solvent.

All manner of onium salts can be prepared by substituting other onium halides in the procedure of Example 2, Part B, Example 11, Part B, and Example 12, Part B. Suitable onium halides include ammonium chloride, octadecyl trimethylammonium bromide, triphenylsulfonium iodide, methyl triphenylarsonium iodide, triphenylselenonium iodide, triphenyltelluronium iodide, tetraphenylstibonium iodide, n-methylpyridinium chloride, and the like.

It is within the scope of this invention to prepare salts, e.g., Pt(PF₂S₂)₂ and Pd(PF₂S₂)₂, by reaction of anhydrous HPF₂S₂ with the corresponding halide salts.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formula:

$$M_{n'}{}^{m+}(P_nF_2S_x)_{m'}{}^{n-}$$

wherein:
n, both the number of phosphorus atoms present in the anion and the valence of the anion, is 1 or 2;
m, the valence of the cation, is 1, 2, 3 or 4;
n' is the number of cations present in the molecule;
m' is the number of anions present in the molecule;
the product nm' is equal to the product n'm;
when n is 1, x, the number of sulfur atoms present, is 2 and M is any cation of positive valence up to and including 4; and
when n is 2, x is 5 or 6 and M is hydrogen, ammonium, an alkali or alkaline earth metal or a hydrocarbylonium group.

2. A compound of claim 1 having the formula:

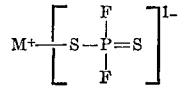

and

M is hydrogen, one equivalent of a metal, ammonium, or a hydrocarbyl-substituted ammonium, sulfonium, arsonium or phosphonium ion in which the hydrocarbyl substituents have no more than 18 carbons.

3. A compound of claim 1 having the formula

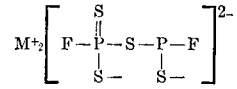

wherein:

M is hydrogen, one equivalent of a metal, ammonium or a hydrocarbyl-substituted ammonium, sulfonium, arsonium or phosphonium ion in which the hydrocarbyl substituents have no more than 18 carbons.

4. A compound of claim 1 having the formula:

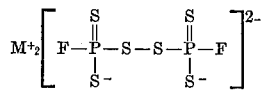

wherein:

M is hydrogen, one equivalent of a metal, ammonium, or a hydrocarbyl-substituted ammonium, sulfonium, arsonium or phosphonium ion in which the hydrocarbyl substituents have no more than 18 carbons.

5. Cesium phosphorodifluoridodithioate, the compound of claim 1 wherein M is cesium, $m$ and $n$ are 1 and $x$ is 2.

6. Tetra-n-propylammonium phosphorodifluoridodithioate, the compound of claim 1 wherein M is tetra-n-propylammonium, $m$ and $n$ are 1 and $x$ is 2.

7. Phosphorodifluoridodithioic acid, the compound of claim 1 wherein M is hydrogen, $m$ and $n$ are 1 and $x$ is 2.

8. Tetraphenylarsonium phosphorodifluoridodithioate, the compound of claim 1 wherein M is tetraphenylarsonium, $m$ and $n$ are 1 and $x$ is 2.

9. Sodium p,p-thiobis(phosphonofluoridodithioate), the compound of claim 1 wherein M is sodium, $m$ is 1, $n$ is 2 and $x$ is 5.

10. p,p'-Thiobis(phosphonofluoridodithioic) acid, the compound of claim 1 wherein M is hydrogen $m$ is 1, $n$ is 2 and $x$ is 5.

11. Tetra-n-propylammonium p,p'-dithiobis-(phosphonofluoridodithioate), the compound of claim 1 wherein M is tetra-n-propylammonium, $m$ is 1, $n$ is 2 and $x$ is 6.

12. Process for preparing alkali metal salts of claim 1 which comprises reacting phosphorus pentasulfide with an alkali metal fluoride in a medium selected from the class consisting of acetonitrile, water and ethylene glycol dimethyl ether.

13. Process for preparing compounds of claim 2 wherein M is an alkali metal which comprises reacting $P_4S_{10}$ with an alkali metal fluoride in acetonitrile.

14. Process for preparing compounds of claim 3 wherein M is an alkali metal which comprises reacting $P_4S_{10}$ with an alkali metal fluoride in water.

15. Process for preparing compounds of claim 4 wherein M is an alkali metal which comprises reacting $P_4S_{10}$ with an alkali metal fluoride in ethylene glycol dimethyl ether.

16. Process for preparing compounds of claim 2 wherein M is an alkali metal which comprises reacting an alkali metal fluoride with $SPF_3$ in the presence of acetonitrile.

References Cited

UNITED STATES PATENTS 2,796,321  6/1957  Taylor _____ 23—50

OTHER REFERENCES

Kuchen et al., Darstellung und Eigenshaften Von Dialkyldithiophosphinato Komplexen Chem. Berichte 97, p. 2306, 1964.

Jorgensen, Absorption Spectra of Transition Group Complexes of S. Containing Ligands, J. of Inorg. Nocl. Chem., 24, 1571, 1962.

LELAND A. SEBASTIAN, Primary Examiner

U.S. Cl. X.R.

23—139, 315, 316, 343, 344, 345, 346; 260—440, 502.4, 502.5

PO-1050
(5/69)

UNITED STATES PATENT OFFICE
CERTIFICATE OF CORRECTION

Patent No. 3,558,269      Dated January 26, 1971

Inventor(s) Herbert W. Roesky

It is certified that error appears in the above-identified patent and that said Letters Patent are hereby corrected as shown below:

Col. 1, line 25, "$M^+[S...]$" should be -- $M^+_2[S...]$ --; line 32, "$M^+[S...]$" should be -- $M^+_2[S...]$ --; lines 49-50, ", and now forfeited, Aug. 3, 1966." should be -- , August 3 1966, and now forfeited. --;

Col. 2, line 49, "$MNO_2$" should be -- $MnO_2$ --;

Col. 3, line 3, "$...S]^-$" should be -- $...S]^{2-}$ --; line 57, "ridodthioate" should be -- ridodithioate --; line 64, insert -- a -- between "of" and "white";

Col. 6, line 36, "$14^{-4}$" should be -- $10^{-4}$ --; line "M.P." should be -- m.p. --; line 57, in the formula, "$...{>}N\overset{\|\,S}{\underset{S}{\diagup}}P...$" should be -- $...{>}Ni\overset{S}{\underset{S}{\diagup\diagdown}}\overset{}{\underset{}{}}P...$ --;

line 66, "$FE(PF_2S_4)_2$" should be -- $Fe(PF_2S_2)_2$ --;

Col. 7, line 25, "M.P." should be -- m.p. --;

Col. 8, line 22, "phonofluoridothioate)" should be -- phonofluorididothioate) --; line 66, "and" should be -- wherein: --; line 72, in the formula "$...S-P-F...$" should -- $...\overset{S}{\underset{S}{S-P-F}}...$ --;

Col. 9, Claim 9, "Sodium-p,p-thiobis..." should be -- Sodium-P,P'-thiobis... --; Claims 10 and 11, two occurrenc "p,p' " should be -- P,P' --.

Signed and sealed this 26th day of September 1972.

(SEAL)
Attest:

EDWARD M. FLETCHER, JR.            ROBERT GOTTSCHALK